United States Patent
Chen et al.

(10) Patent No.: US 10,601,176 B1
(45) Date of Patent: Mar. 24, 2020

(54) CONNECTING DEVICE AND VEHICLE AND CHARGER USING THE SAME

(71) Applicant: Gogoro Inc., Hong Kong (CN)

(72) Inventors: Zih-Wei Chen, Hsinchu (TW);
Yu-Jung Wang, New Taipei (TW);
Chen-Hsin Hsu, New Taipei (TW)

(73) Assignee: Gogoro Inc., Hong Kong (CN)

( * ) Notice: Subject to any disclaimer, the term of this patent is extended or adjusted under 35 U.S.C. 154(b) by 0 days.

(21) Appl. No.: 16/389,838

(22) Filed: Apr. 19, 2019

(51) Int. Cl.
| | |
|---|---|
| *H01R 13/629* | (2006.01) |
| *H01R 31/06* | (2006.01) |
| *H01R 13/428* | (2006.01) |
| *H02J 7/00* | (2006.01) |
| *H01R 13/24* | (2006.01) |
| *B60L 53/16* | (2019.01) |

(52) U.S. Cl.
CPC ............ *H01R 13/629* (2013.01); *B60L 53/16* (2019.02); *H01R 13/24* (2013.01); *H01R 13/428* (2013.01); *H01R 31/06* (2013.01); *H02J 7/0042* (2013.01)

(58) Field of Classification Search
CPC .. H01R 13/625; H01R 13/623; H01R 13/641; H01R 13/629; H01R 13/428; H01R 13/24; H01R 31/06; H02G 7/0042; B60L 53/16
USPC .................................. 439/317, 318, 315, 489
See application file for complete search history.

(56) References Cited

U.S. PATENT DOCUMENTS

| | | | | |
|---|---|---|---|---|
| 5,478,250 | A * | 12/1995 | Hoffman | B60L 53/305 439/142 |
| 5,627,448 | A * | 5/1997 | Okada | B60L 3/12 439/133 |
| 6,053,756 | A * | 4/2000 | Flanigan | H01R 13/641 439/315 |
| 6,336,822 | B1 * | 1/2002 | Luzzoli | H01R 13/625 439/314 |
| 8,608,507 | B2 * | 12/2013 | Van Swearingen | H01R 12/79 439/317 |
| 2007/0281532 | A1 * | 12/2007 | Cannon | G01R 1/06788 439/318 |
| 2010/0178788 | A1 * | 7/2010 | Collin | H01R 13/625 439/317 |
| 2011/0021057 | A1 * | 1/2011 | Katagiyama | H01R 13/625 439/345 |

* cited by examiner

*Primary Examiner* — Gary F Paumen
(74) *Attorney, Agent, or Firm* — Perkins Coie LLP

(57) ABSTRACT

A connecting device includes a base, a locking member, linkage, and a detector. The locking member is rotatably disposed on the base and configured to rotate about an axis to a locked position along a first rotational direction and to an unlocked position along a second rotational direction opposite to the first rotational direction. The locking member has an engaging portion at a peripheral edge thereof. The linkage is rotatably disposed on the base and includes an abutting portion configured to abut against the peripheral edge. When the locking member is rotated to the locked position, the abutting portion is moved to and is engaged with the engaging portion accompanied with a rotation of the linkage. The detector is disposed on the base and configured to detect the rotation of the linkage.

20 Claims, 11 Drawing Sheets

CONNECTING DEVICE AND VEHICLE AND CHARGER USING THE SAME

TECHNICAL FIELD

The present disclosure relates to a connecting device, and more particularly, to a connecting device used in a vehicle or a charger.

BACKGROUND

Batteries such as lithium-ion batteries are known for storing more energy into smaller and lighter units. Various applications have been found for lithium ion batteries, more particularly, applications in powering portable electronic devices such as cell phones, tablets, laptops, power tools, and other high-current equipment. Characteristics such as low weight and high energy density of lithium-ion batteries also make it one of the best candidates for use in hybrid electric vehicles and fully electric-powered vehicles.

With the proliferation of electric powered devices (e.g., electric powered tools, appliances, personal portable communication devices, laptop and tablet computers, personal media devices, vehicles and the like), there is interest in designs of battery packs and battery pack electrical connections. For example, the designs may relate to minimizing the likelihood of installing a battery pack in an orientation within a device to be powered by the battery pack or within a device for charging the battery pack. As such, the electrical power does not flow between the two or does flow, but creates unsafe consequences.

However, even when a battery pack is installed/inserted in a proper orientation, the electrical connection between electrical terminals of the battery pack and electrical terminals of a device to be powered by the battery pack or a device for charging the battery pack may still not operate as designed. For example, undesired conductive or nonconductive materials could be lodged between the terminals of the battery pack and the device/charger, thus resulting in the terminals being partly damaged or completely broken. Such conditions can result in unsafe consequences and degraded performance. Thus, there is an interest for the industry to develop effective ways for confirming the electrical connection between the electrical terminals of the battery pack and the electrically powered device or the device for charging the battery. Accordingly, it is important for the industry to provide a connecting device capable of solving the aforementioned problems.

SUMMARY

An aspect of the disclosure is to provide a connecting device capable of efficiently solving the aforementioned problems. According to an embodiment of the disclosure, a connecting device includes a base, a locking member, linkage, and a detector. The locking member is rotatably disposed on the base and configured to rotate about an axis to a locked position along a first rotational direction and to an unlocked position along a second rotational direction opposite to the first rotational direction. An engaging portion is provided at a peripheral edge of the locking member. The linkage is rotatably disposed on the base and includes an abutting portion configured to abut against the peripheral edge. When the locking member is rotated to the locked position, the abutting portion is moved to and is engaged with the engaging portion accompanied with a rotation of the linkage. The detector is disposed on the base and configured to detect the engagement between the abutting portion and the engaging portion.

In an embodiment of the disclosure, the connecting device further includes an actuation module. The actuation module is disposed on the base and includes a moving member. The actuation module is configured to rotate the linkage through the moving member so the abutting portion is disengaged from the engaging portion.

In an embodiment of the disclosure, the actuation module further includes a resilient member. The resilient member is configured to apply a force to the linkage through the moving member, such that the abutting portion is continuously abutted against the peripheral edge.

In an embodiment of the disclosure, the moving member has a pushing portion configured to push the locking member to rotate along the second rotational direction after the abutting portion is disengaged from the engaging portion.

In an embodiment of the disclosure, the connecting device further includes a resilient member disposed on the base. The resilient member is configured to apply a force to rotate the locking member along the second rotational direction.

In an embodiment of the disclosure, the resilient member is connected between the base and the locking member. In an embodiment of the disclosure, the resilient member is connected between the linkage and the locking member. In an embodiment of the disclosure, the connecting device further includes a connecting bar connected between the linkage and the locking member.

In an embodiment of the disclosure, one of the linkage and the locking member is rotatably and slidably connected to the connecting bar. Another of the linkage and the locking member is pivotally connected to the connecting bar.

In an embodiment of the disclosure, the connecting bar has a sliding chute. Said one of the linkage and the locking member has a protrusion rotatably and slidably engaged with the sliding chute.

In an embodiment of the disclosure, said another of the linkage and the locking member has a pivotal portion pivotally connected to the connecting bar. The sliding chute has two ends. Distances from the pivotal portion respectively to said two ends are different.

In an embodiment of the disclosure, the sliding chute has two ends. The protrusion is abutted against said two ends when the locking member is rotated to the locked position and the unlocked position, respectively.

In an embodiment of the disclosure, the connecting device further includes a stage configured to move toward and away from the base. The stage has a first inclined portion and a second inclined portion. The first inclined portion pushes the locking member to rotate along the first rotational direction when the stage is moved toward the base. The second inclined portion pushes the locking member to rotate along the second rotational direction when the stage is moved away from the base.

In an embodiment of the disclosure, the stage has a sliding chute. The first inclined portion and the second inclined portion are opposite inner edges of the sliding chute. The locking member has a protrusion slidably engaged with the sliding chute.

In an embodiment of the disclosure, the axis passes through the base. The stage is configured to move toward and away from the base along the axis. In an embodiment of the disclosure, the connecting device further includes a retaining member disposed on the base and configured to guide the stage to move toward and away from the base. In an embodiment of the disclosure, the locking member includes a plurality of hooks. The hooks surround the axis and, and each of the hooks substantially extends along the first rotational direction. In an embodiment of the disclosure, the locking member is ring-shaped.

According to another embodiment of the disclosure, a vehicle includes a housing and the connecting device. The base is a part of the housing.

According to another embodiment of the disclosure, a charger includes a housing and the connecting device. The base is a part of the housing.

Accordingly, in the connecting device of the disclosure, the locking member is configured to lock an installed/inserted battery pack while rotating to the locked position. The linkage of the connecting device is configured to keep the locking member in the locked position, thereby ensuring that the battery pack stays engaged with the connecting device. In addition, the linkage is designed to rotate to lock the locking member when the locking member is rotated to the locked position, and the detector of the connecting device is configured to detect the rotation of the linkage. As such, by determining whether the locking member is rotated to the locked position (through detecting the rotation of the linkage), whether the battery pack is properly installed/inserted to connect the connecting device can be determined.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
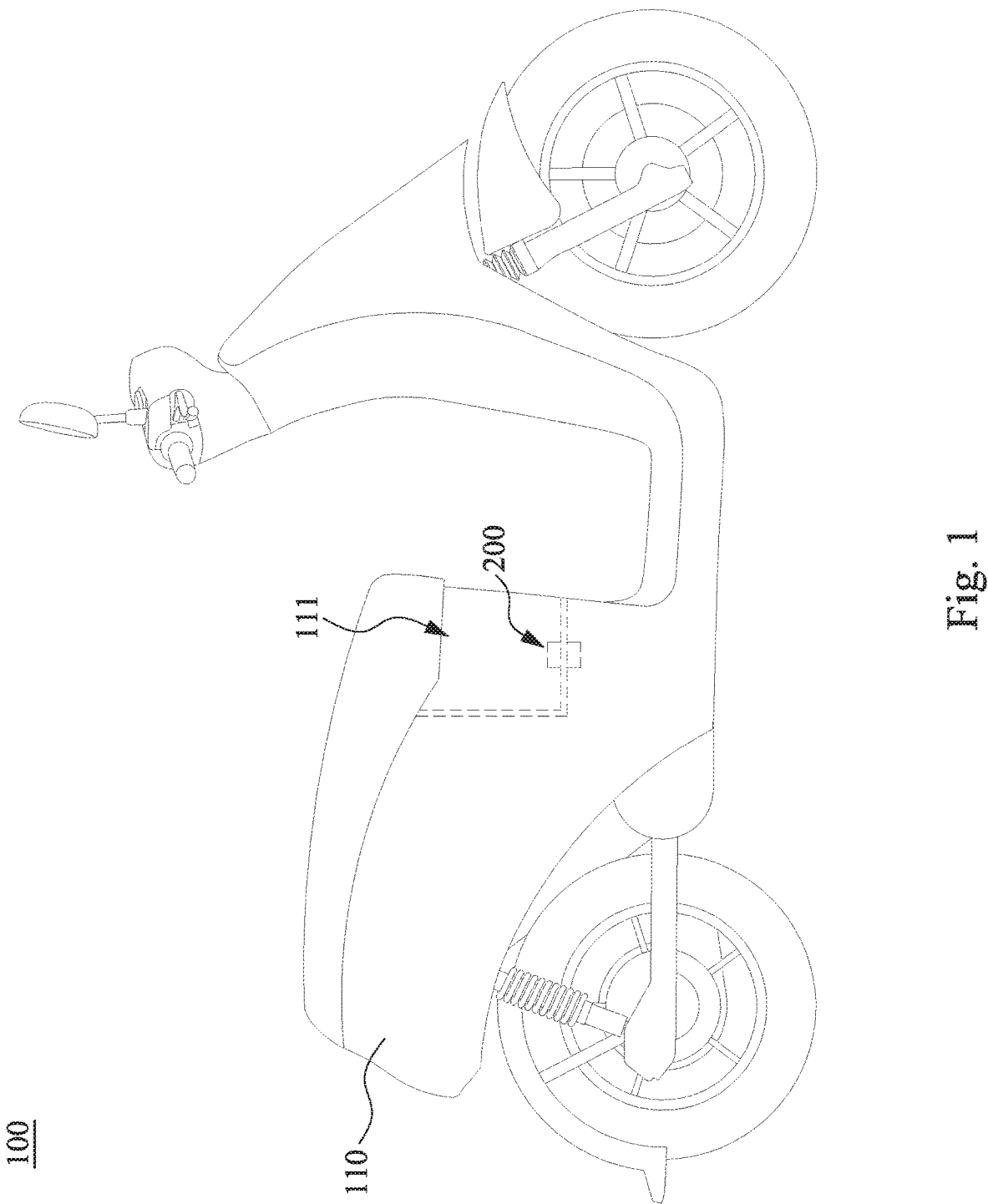
FIG. 1 is a side view of a vehicle according to some embodiments of the disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a side view of a vehicle 100 according to some embodiments of the disclosure. As shown in FIG. 1, the vehicle 100 (e.g., a straddle-type vehicle) includes a housing 110 and a connecting device 200. The housing 110 has an accommodating space 111 therein, and the connecting device 200 is disposed in the accommodating space 111 of the housing 110. In some embodiments, the accommodating space 111 serves as a battery bay for accommodating a battery pack, and the connecting device 200 is configured to establish an electrical connection between the power system of the vehicle 100 and the battery pack.

Figure 2:
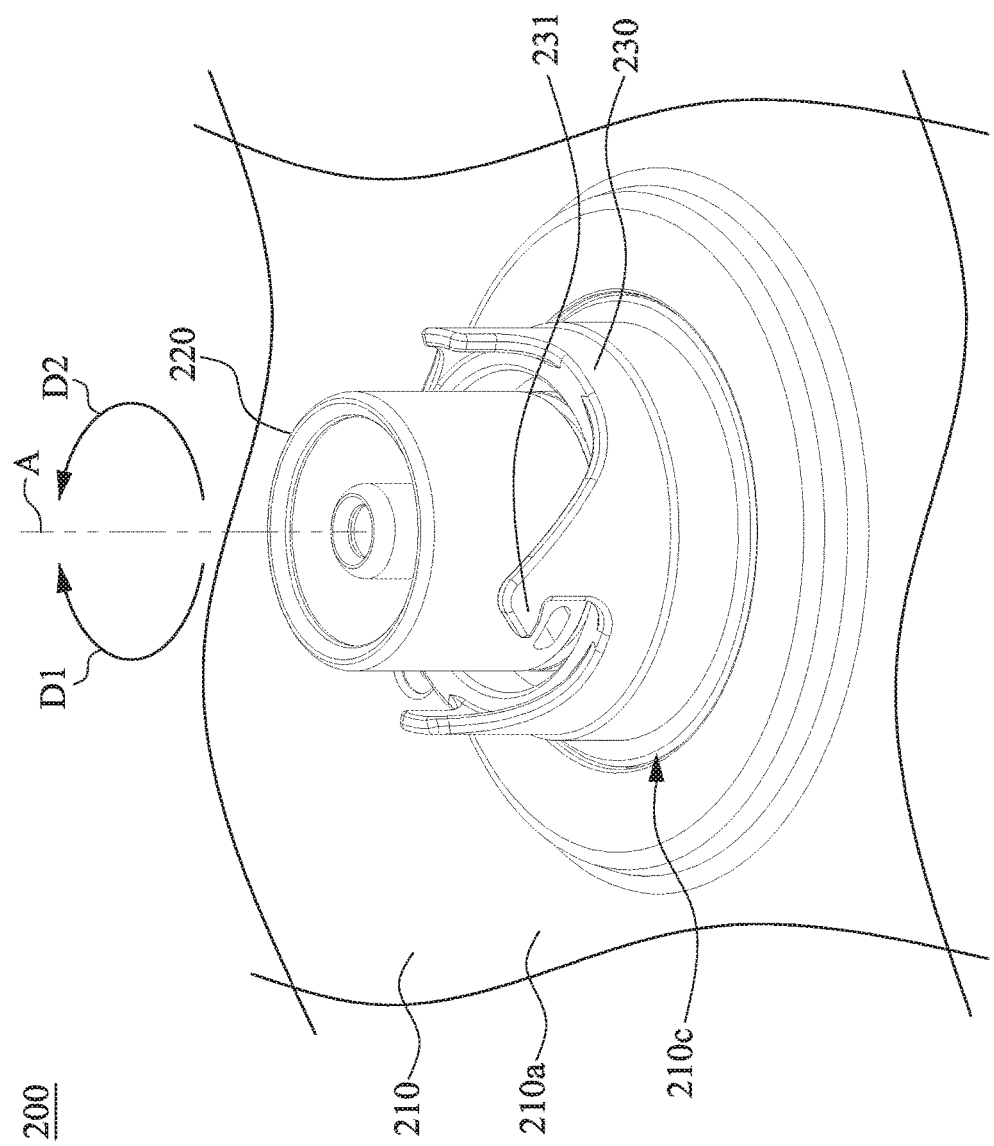
FIG. 2 is a perspective view of a connecting device according to some embodiments of the disclosure.

Reference is made to FIG. 2. FIG. 2 is a perspective view of the connecting device 200 according to some embodiments of the disclosure. As shown in FIG. 2, the connecting device 200 includes a base 210, a connector 220, and a locking member 230. The base 210 is a part of the housing 110 of the vehicle 100. The base 210 has a first surface 210a (e.g., a top surface), a second surface 210b (e.g., a bottom surface, referring to FIG. 3A) and a through hole 210c in spatial communication with the first surface 210a and the second surface 210b. The connector 220 is configured to pass through the through hole 210c. The locking member 230 is also configured to pass through the through hole 210c and is rotatably disposed on the base 210. The locking member 230 is configured in such a way that it can be rotated about an axis A to a locked position (referring to FIG. 3B) along a first rotational direction D1 and to an unlocked position (referring to FIG. 3A) along a second rotational direction D2 opposite to the first rotational direction D1.

As shown in FIG. 2, the axis A is positioned through the base 210 and substantially extends through a center of the connector 220. The locking member 230 is ring-shaped and is positioned such that it encloses the connector 220, but the disclosure is not limited in this regard. The locking member 230 is formed with a plurality of hooks 231, which substantially extend along the first rotational direction D1. The axis A is positioned at the center of the locking member 230 and the hooks 231. In practical applications, the battery pack includes a plurality of engaging structures. After the battery pack is inserted into the accommodating space 111 for connecting the connectors 220, the engaging structures are engaged with the hooks 231 when the locking member 230 is rotated to the locked position.

Figure 3A:
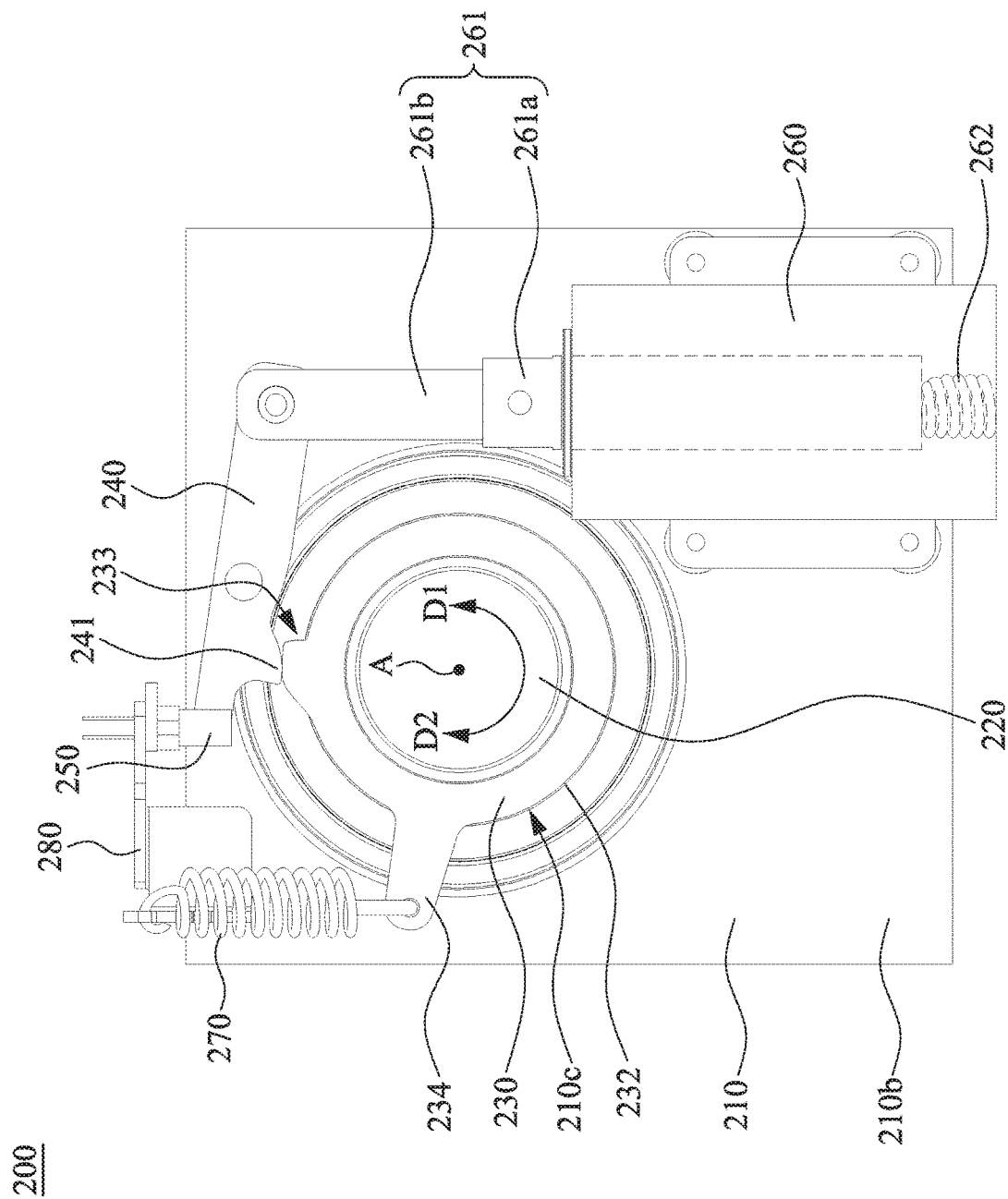
FIG. 3A is a bottom view of the connecting device shown in FIG. 2 according to some embodiments of the disclosure, in which a locking member is at an unlocked position.
Figure 3B:
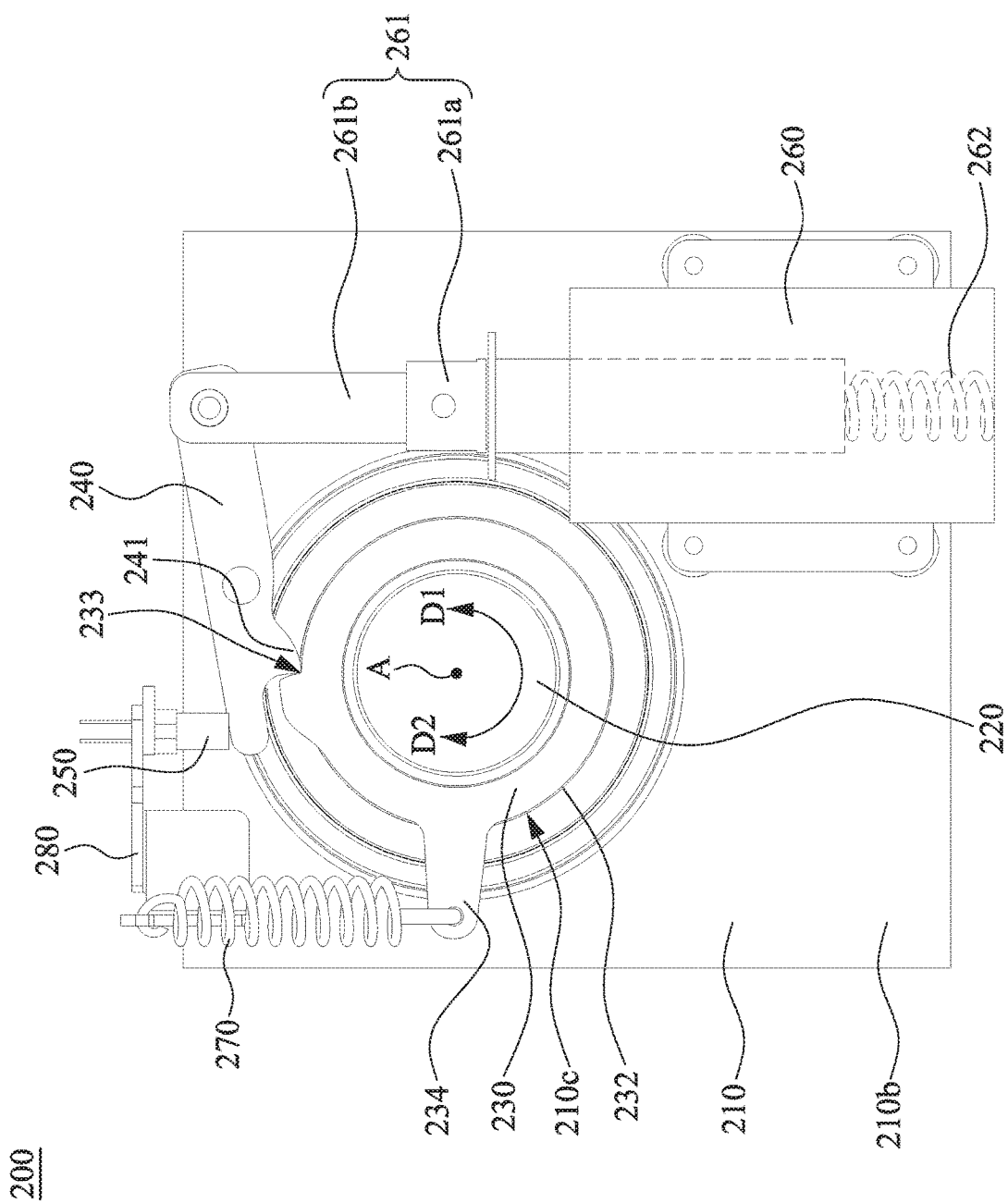
FIG. 3B is another bottom view of the connecting device shown in FIG. 3A according to some embodiments of the disclosure, in which the locking member is at a locked position.

Reference is made to FIGS. 3A and 3B. FIG. 3A is a bottom view of the connecting device 200 shown in FIG. 2 according to some embodiments of the disclosure, in which the locking member 230 is at the unlocked position. FIG. 3B is another bottom view of the connecting device 200 shown in FIG. 3A according to some embodiments of the disclosure, in which the locking member 230 is at a locked position. As shown in FIGS. 3A and 3B, the locking member 230 is formed with an engaging portion 233 at a peripheral edge 232 thereof. The connecting device 200 further includes a linkage 240. The linkage 240 is rotatably disposed on the base 210 and includes an abutting portion 241 configured to abut against the peripheral edge 232 of the locking member 230. When the locking member 230 is rotated to the locked position along the first rotational direction D1 (as switching from FIG. 3A to FIG. 3B), the abutting portion 241 is moved along the peripheral edge 232 and is engaged with the engaging portion 233 of the locking member 230. As such, the locking member 230 can be kept in the locked position by the linkage 240, thereby ensuring that the battery pack does not disengage from the connecting device 200. In practical applications, structures of the engaging portion 233 of the locking member 230 and the abutting portion 241 of the linkage 240 are interchangeable.

As shown in FIGS. 3A and 3B, the linkage 240 rotates when the abutting portion 241 is moved along the peripheral edge 232 and is engaged with the engaging portion 233 of the locking member 230 (as switching from FIG. 3A to FIG. 3B). The connecting device 200 further includes a detector 250 and a fixing member 280. The fixing member 280 is disposed on the second surface 210b of the base 210. The detector 250 is disposed on the base 210 via the fixing member 280 and is configured to detect the position of the engaging portion 233. More particularly, whether the locking member 230 is at the locked position can be determined by the detection results regarding the position of the engaging portion 233. Once the position of the locking member 230 is known, whether the battery pack is properly installed/inserted to connect the connecting device 200 can be determined. In some embodiments, the detector 250 is a photointerrupter which consists of a light emitting element and a light receiving element aligned facing each other in a single package. In some embodiments, the detector 250 works by detecting light transmission between the light emitting element and the light receiving element when the linkage 240 leaves the gap formed between the light emitting element and the light receiving element. Specifically, when the abutting portion 241 is disengaged from the engaging portion 233, the linkage 240 inserts into the gap and blocks the light transmitted between the light emitting element and the light receiving element; when the abutting portion 241 is engaged with the engaging portion 233, the linkage 240 leaves the gap and allows the light transmitted between the light emitting element and the light receiving element. That is, the detector 250 acts as an optical switch. In some other embodiments, the detector 250 can be a suitable mechanism, a reed switch, or the like.

As shown in FIGS. 3A and 3B, the connecting device 200 further includes an actuation module 260. The actuation module 260 is disposed on the base 210 and includes a moving member 261. The moving member 261 includes a driving shaft 261a and an extending bar 261b connected to an end of the driving shaft 261a. The actuation module 260 is configured to rotate the linkage 240 through the moving member 261. More specifically, when the linkage 240 is rotated, the abutting portion 241 can be disengaged from the engaging portion 233 of the locking member 230. Consequently, the locking member 230 is unlocked by the linkage 240. In some embodiments, the actuation module 260 is an electromagnetic switch, but the disclosure is not limited in this regard.

As shown in FIGS. 3A and 3B, the actuation module 260 further includes a resilient member 262 disposed therein. The resilient member 262 is configured to apply a force to the linkage 240 through the moving member 261, such that the abutting portion 241 of the linkage 240 is continuously abutted against the peripheral edge 232 of the locking member 230. As such, when the locking member 230 is rotated to the locked position (referring to FIG. 3B), the linkage 240 rotates in accordance with the force applied by the resilient member 262 through the moving member 261. In such a way, the abutting portion 241 automatically moves along the peripheral edge 232 to be engaged with the engaging portion 233 of the locking member 230. In some embodiments, the resilient member 262 is a compression spring, but the disclosure is not limited in this regard.

As shown in FIGS. 3A and 3B, the connecting device 200 further includes a resilient member 270 disposed on the base 210. Specifically, the locking member 230 further includes an extending portion 234 protruding from the peripheral edge 232 thereof. The resilient member 270 is connected between the fixing member 280 and the extending portion 234 of the locking member 230. Further, the resilient member 270 is configured to apply a force to rotate the locking member 230 along the second rotational direction D2. As such, when the linkage 240 is rotated and the abutting portion 241 is disengaged from the engaging portion 233 of the locking member 230 (i.e., the locking member 230 is unlocked), the locking member 230 automatically rotates to the unlocked position (referring to FIG. 3A) in accordance with the force applied by the resilient member 270. Consequently, the battery pack is automatically detached from the connector 220 and thus can be lifted and picked up by the user. In some embodiments, the resilient member 270 is a tension spring, but the disclosure is not limited in this regard.

Figure 4A:
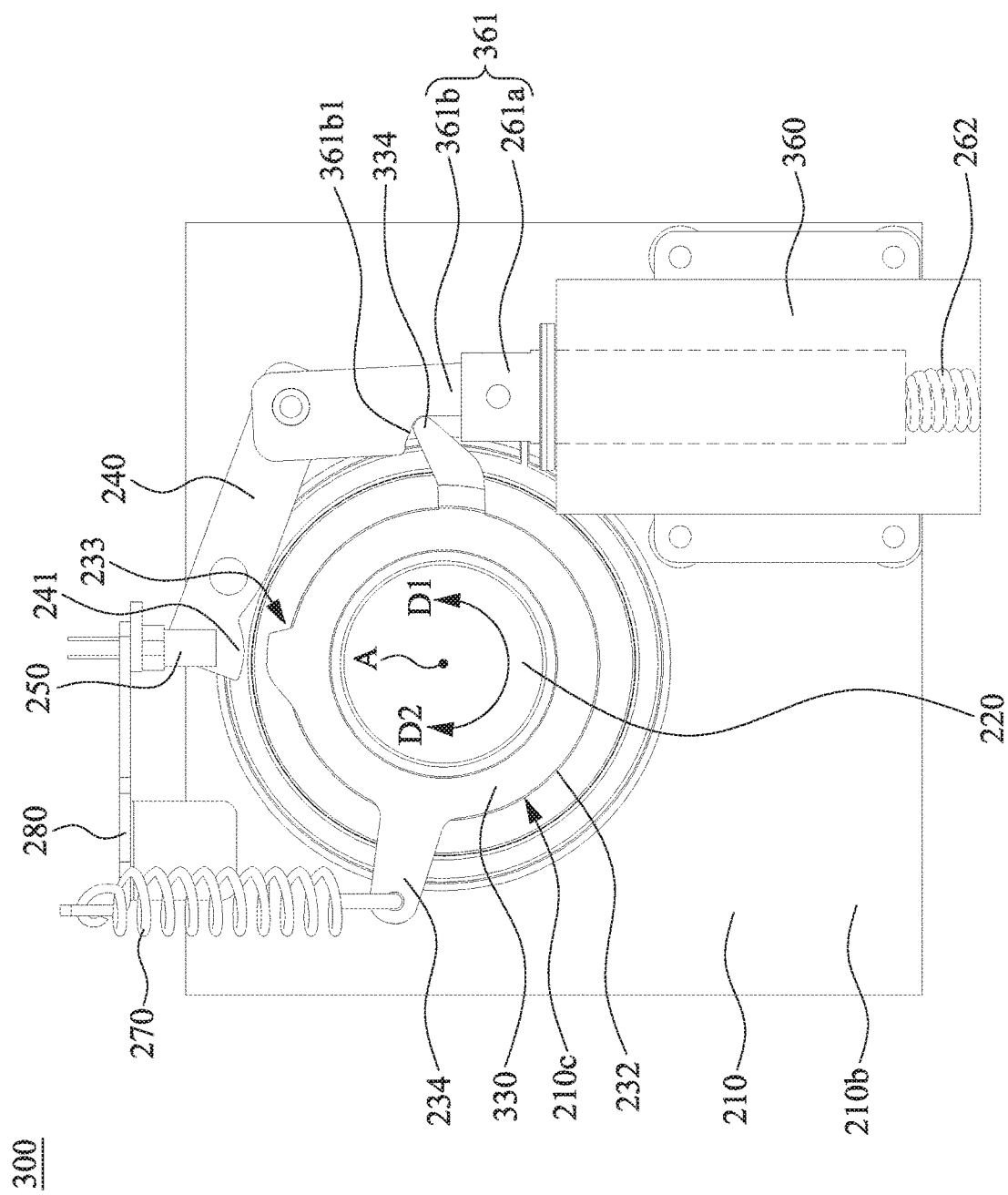
FIG. 4A is a bottom view of a connecting device according to some embodiments of the disclosure, in which a locking member is at an unlocked position.
Figure 4B:
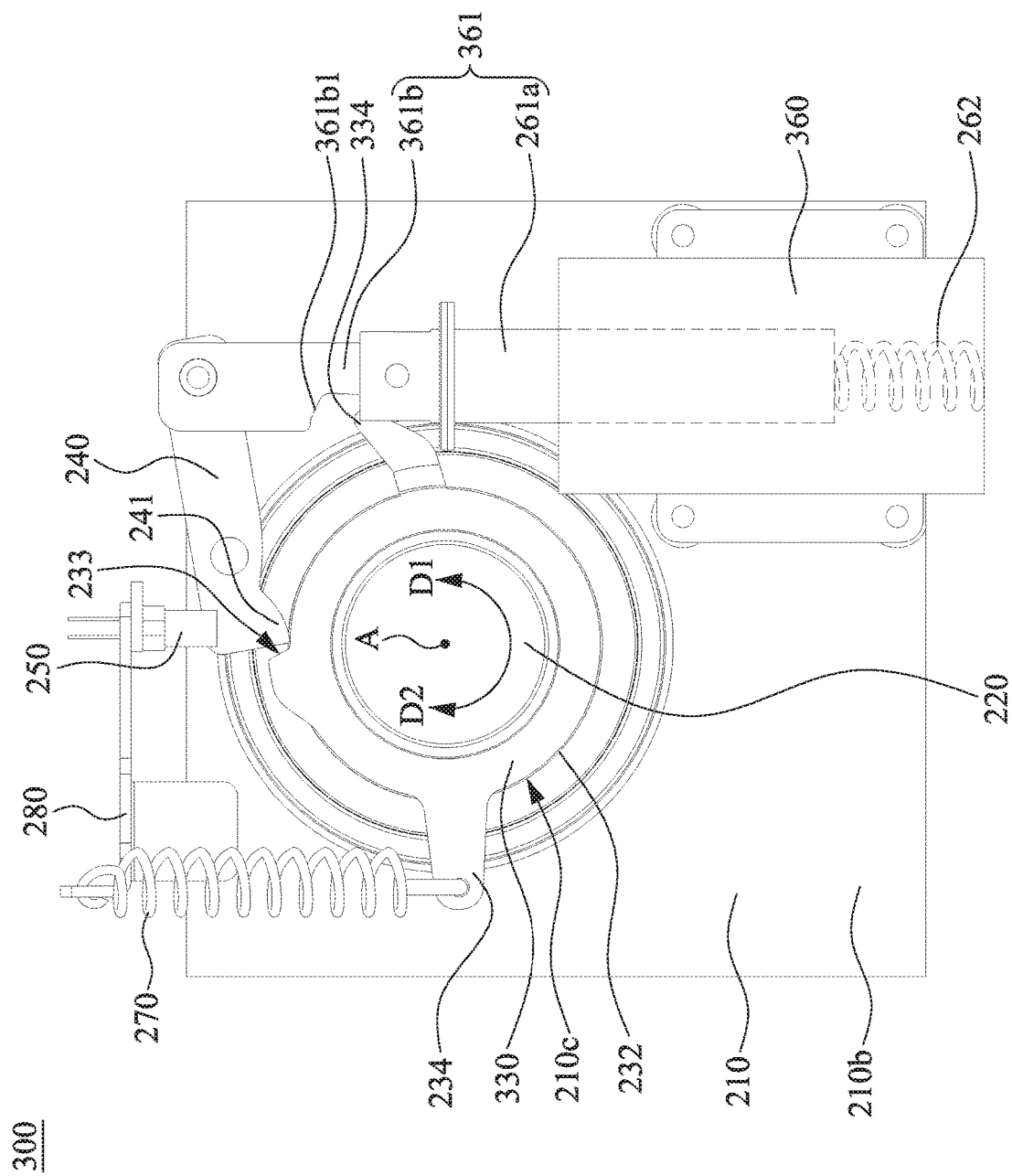
FIG. 4B is another bottom view of the connecting device shown in FIG. 4A according to some embodiments of the disclosure, in which the locking member is at a locked position.

Reference is made to FIGS. 4A and 4B. FIG. 4A is a bottom view of a connecting device 300 according to some embodiments of the disclosure, in which a locking member 330 is at an unlocked position. FIG. 4B is another bottom view of the connecting device 300 shown in FIG. 4A according to some embodiments of the disclosure, in which the locking member 330 is at a locked position. As shown in FIGS. 4A and 4B, the connecting device 300 includes a base 210, a connector 220, a locking member 330, a linkage 240, a detector 250, an actuation module 360, a resilient member 270 and a fixing member 280. Herein, the base 210, the connector 220, the linkage 240, the detector 250, the resilient member 270 and the fixing member 280 are identical or similar to those of the embodiments as illustrated in FIGS. 3A and 3B. Therefore, descriptions of these components are the same and would not be repeated here for simplicity. Compared with the embodiments as illustrated in FIGS. 3A and 3B, the locking member 330 further includes another extending portion 334 protruding from the peripheral edge 232 of the locking member 330. Furthermore, the extending bar 361b of the moving member 361 of the actuation module 360 is provided with a pushing portion 361b1. The pushing portion 361b1 is configured to push the locking member 330 via the extending portion 334 to rotate along the second rotational direction after the abutting portion 241 of the linkage 240 is disengaged from the engaging portion 233 of the locking member 330. As such, when the locking member 330 is stuck and cannot rotate in accordance with the force applied by the resilient member 270 after the abutting portion 241 is disengaged from the engaging portion 233, the pushing portion 361b1 may force the locking member 330 to rotate to the unlocked position (referring to FIG. 4A) by pushing the extending portion 334. The above-mentioned situation in which the locking member 330 is stuck may occur when the connector 220 is malfunctioning or is jammed by a foreign substance. That is, the locking member 330 can be ensured to rotate to the unlocked position by the designs of the pushing portion 361b1 on the extending bar 361b and the extending portion 334 of the locking member 330 when the resilient member 270 fails to rotate the locking member 330.

Figure 5A:
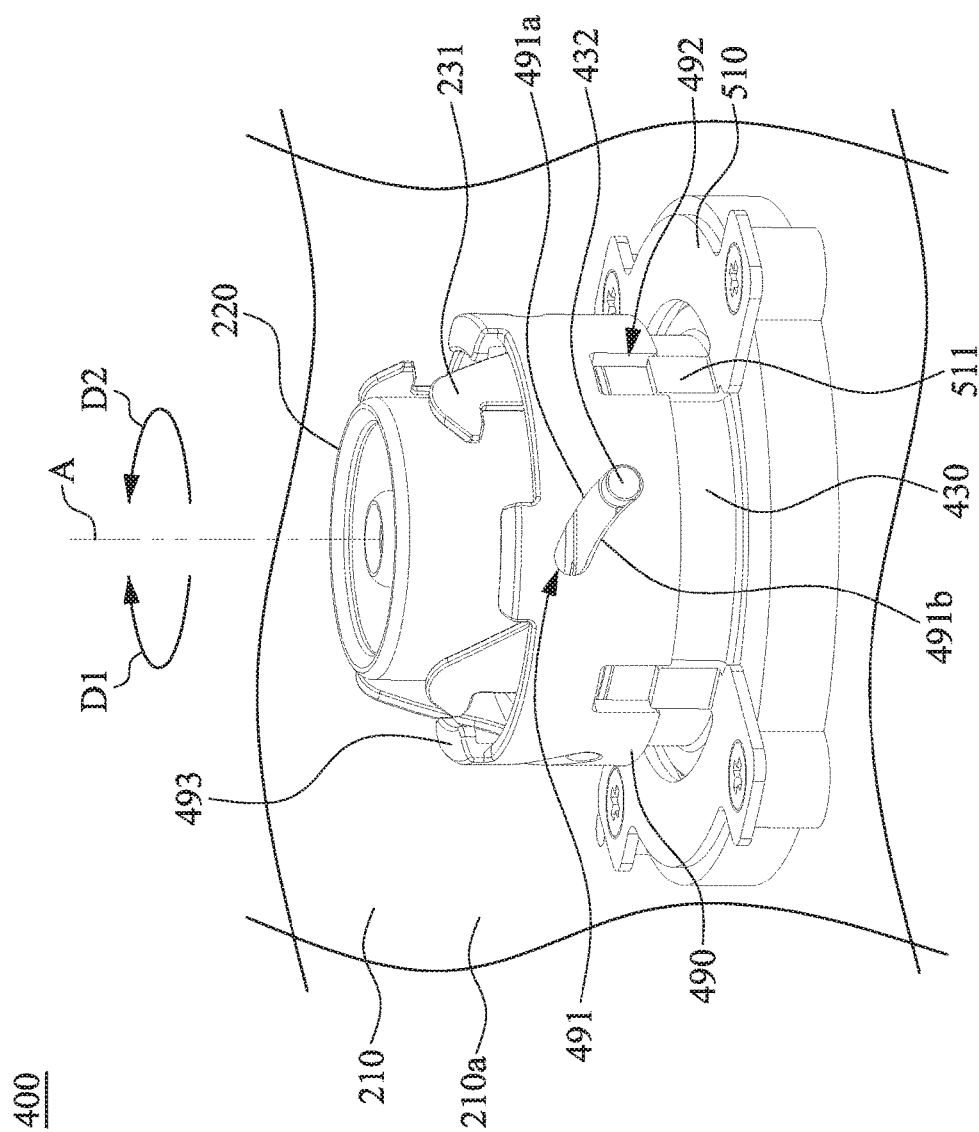
FIG. 5A is a perspective view of a connecting device according to some embodiments of the disclosure, in which a locking member is at an unlocked position.
Figure 5B:
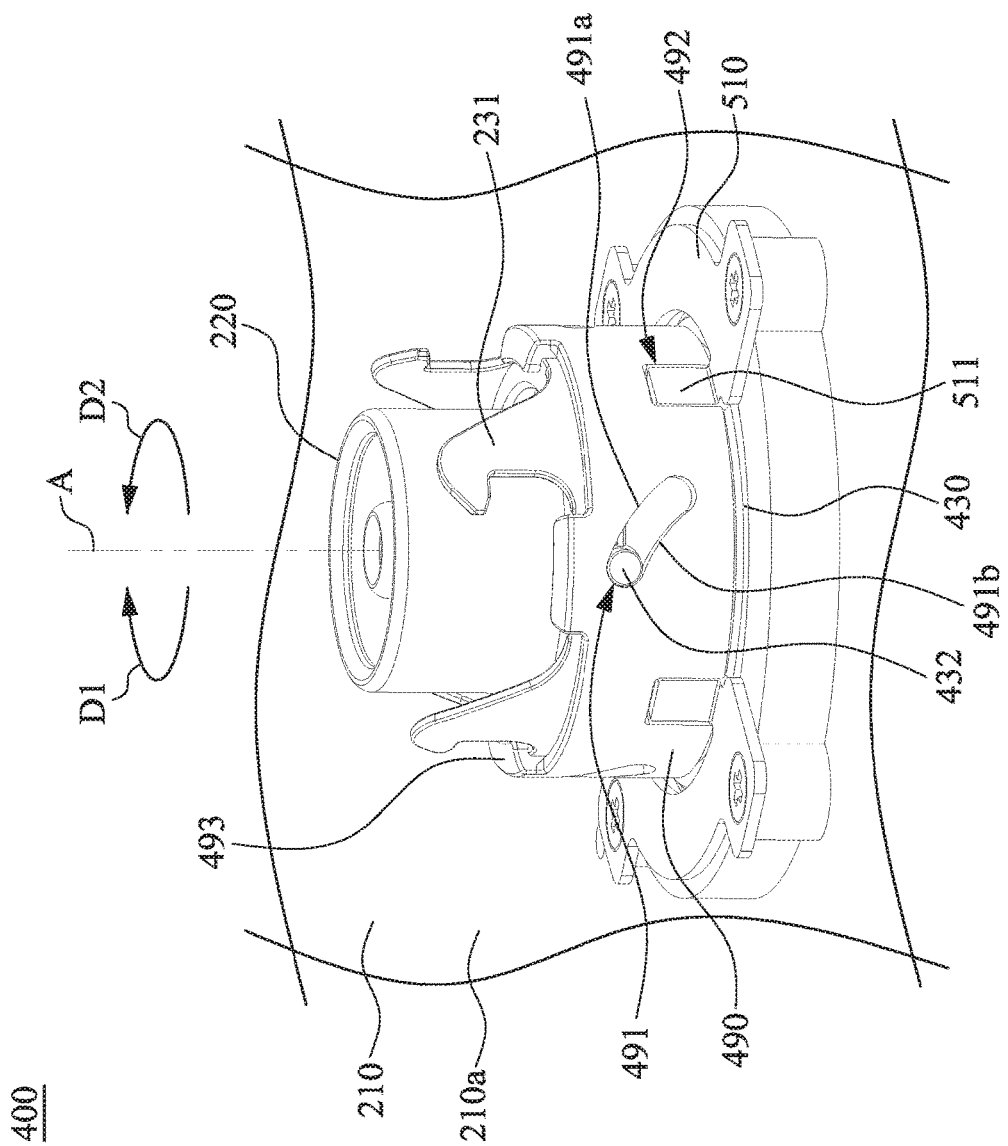
FIG. 5B is another perspective view of the connecting device shown in FIG. 5A, in which the locking member is at a locked position.

Reference is made to FIGS. 5A and 5B. FIG. 5A is a perspective view of a connecting device 400 according to some embodiments of the disclosure, in which a locking member 430 is at an unlocked position. FIG. 5B is another perspective view of the connecting device 400 shown in FIG. 5A, in which the locking member 430 is at a locked position. As shown in FIGS. 5A and 5B, the connecting device 400 includes a base 210, a connector 220, a locking member 430, a stage 490, and a retaining member 510. Hence, the base 210 and the connector 220 are identical or similar to those of the embodiments as illustrated in FIG. 2. Therefore, descriptions of these components are the same and would not be repeated here for simplicity. The stage 490 is configured to move toward and away from the base 210 and has a sliding chute 491. The sliding chute 491 is inclined relative to the axis A and has a first inclined portion 491a and a second inclined portion 491b. The first inclined portion 491a and the second inclined portion 491b are opposite inner edges of the sliding chute 491. The locking member 430 has a protrusion 432 slidably engaged with the sliding chute 491. As such, the first inclined portion 491a may push the protrusion 432 to make the locking member 430 rotate along the first rotational direction A1 when the stage 490 is moved toward the base 210 (as switching from FIG. 5A to FIG. 5B), and the second inclined portion 491b may push the protrusion 432 to make the locking member 430 rotate along the second rotational direction D2 when the stage 490 is moved away from the base 210 (as switching from FIG. 5B to FIG. 5A).

As shown in FIGS. 5A and 5B, the stage 490 has sliding chutes 492 substantially extending along the axis A, and the retaining member 510 is disposed on the first surface 210a of the base 210 and has protrusions 511 slidably engaged with the sliding chutes 492 respectively, such that the stage 490 is ensured to move toward and away from the base 210 along the axis A with the guidance of the protrusions 511 of the retaining member 510. In practical applications, structures of the sliding chutes 492 of the stage 490 and the protrusions 511 of the retaining member 510 are interchangeable.

As shown in FIGS. 5A and 5B, the stage 490 includes supporting portions at a side of the stage 490 away from the base 210 and substantially coplanar. The supporting portions are configured to support at the bottom of the battery pack such that the bottom of the battery pack may avoid being scratched by the hooks 231 of the locking member 430 when the battery pack is moved toward and/or away from the connector 220 along the axis A. Accordingly, the stage 490 may improve reliability of the battery pack by preventing wear-and-tear due to abrasion.

Figure 6A:
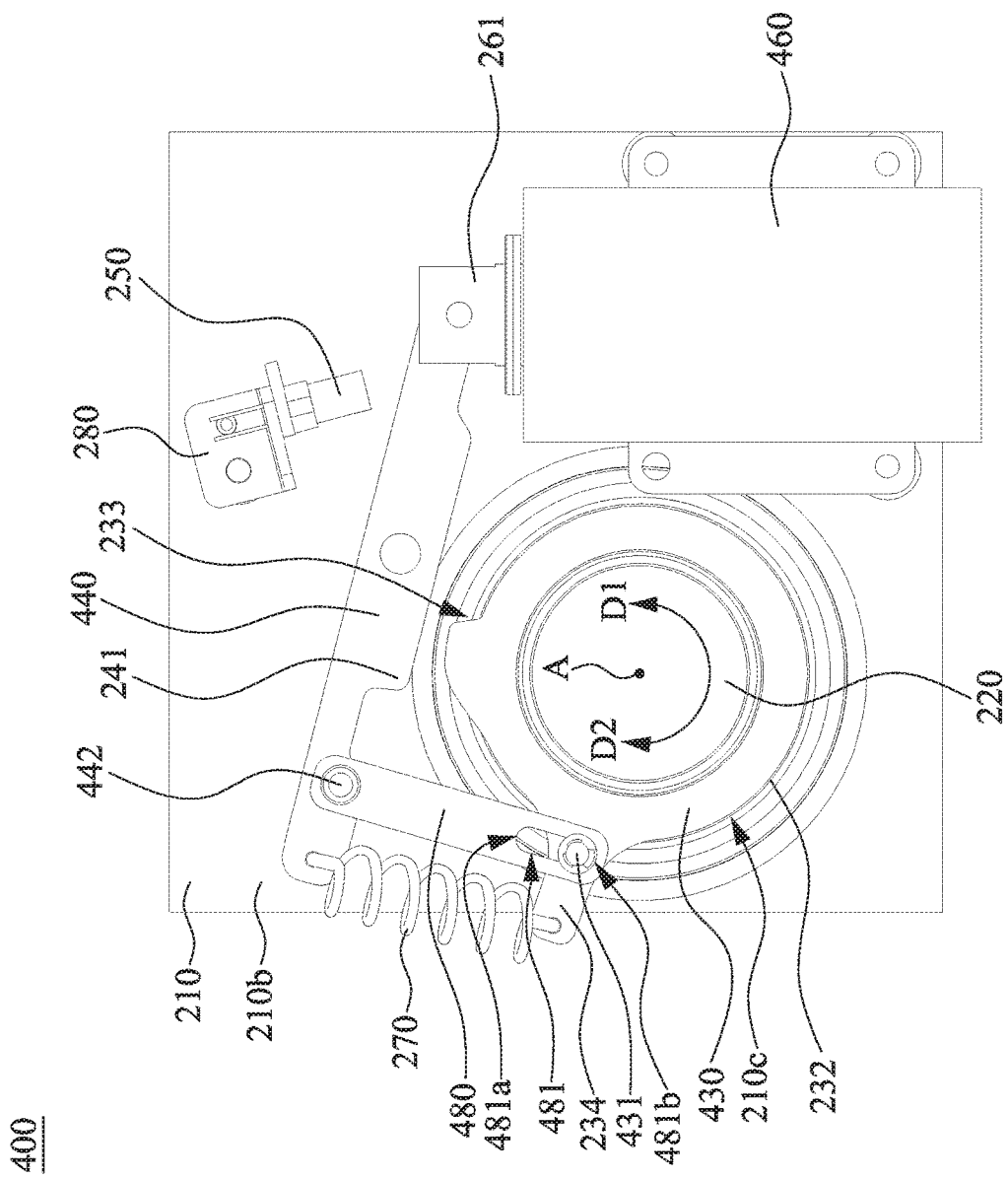
FIG. 6A is a bottom view of the connecting device shown in FIG. 5A according to some embodiments of the disclosure.
Figure 6B:
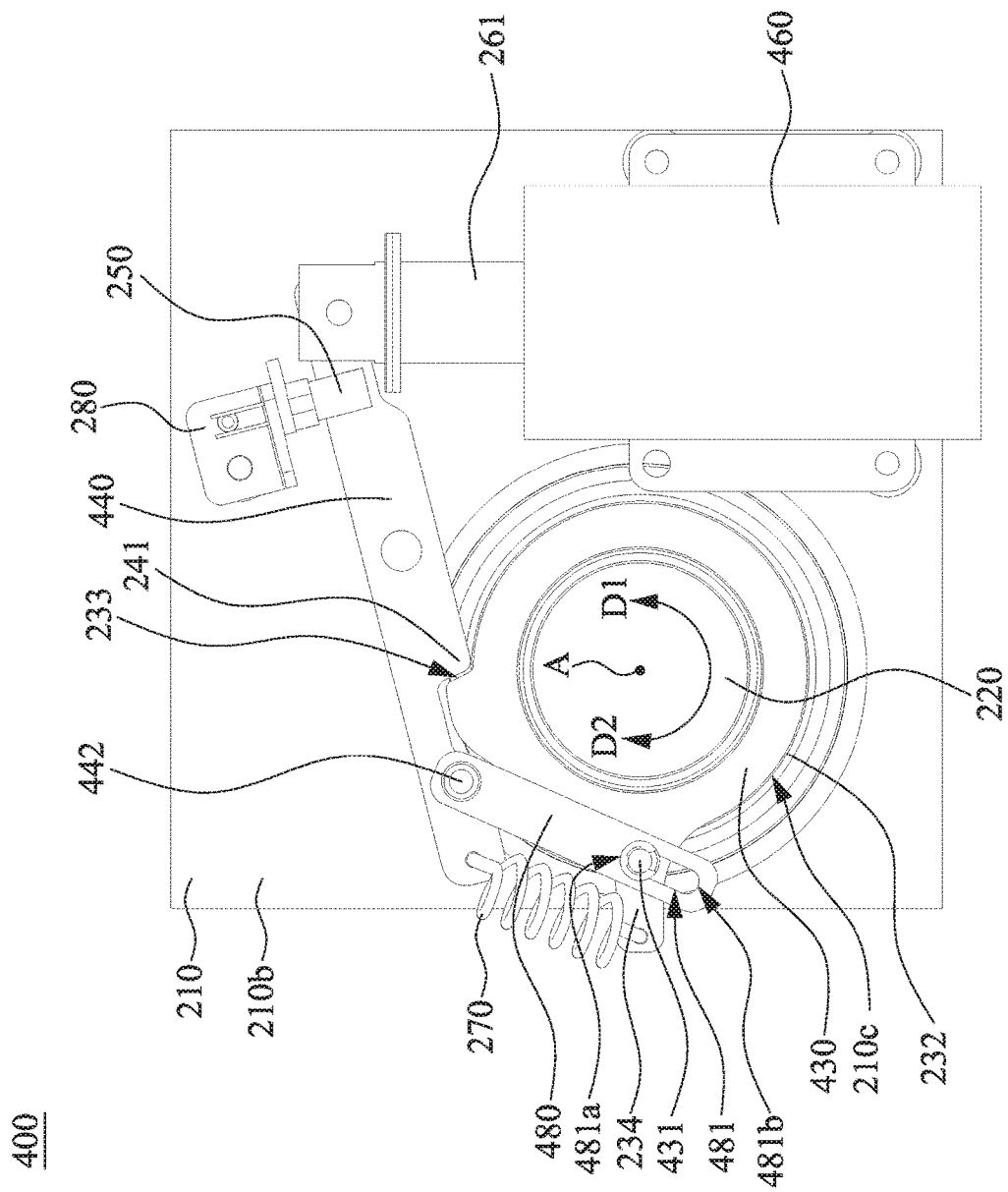
FIG. 6B is a bottom view of the connecting device shown in FIG. 5B according to some embodiments of the disclosure.

Reference is made to FIGS. 6A and 6B. FIG. 6A is a bottom view of the connecting device 400 shown in FIG. 5A according to some embodiments of the disclosure. FIG. 6B is a bottom view of the connecting device 400 shown in FIG. 5B according to some embodiments of the disclosure. As shown in FIGS. 6A and 6B, the connecting device 400 further includes a linkage 440, a detector 250, an actuation module 460, a resilient member 270, and a fixing member 280. Hence, the detector 250, the resilient member 270, and the fixing member 280 are identical or similar to those of the embodiments as illustrated in FIGS. 3A and 3B; therefore, descriptions of these components are the same and would not be repeated here for simplicity. Compared with the embodiments as illustrated in FIGS. 3A and 3B, the resilient member 270 is connected between the extending portion the linkage 440 and the extending portion 234 of the locking member 430. With the structural configuration, when the locking member 430 is rotated to the locked position (as switching from FIG. 6A to FIG. 6B) along the first rotational direction D1, the resilient member 270 may pull the linkage 440 to rotate and thus makes the abutting portion 241 of the linkage 440 move to and be engaged with the engaging portion 233 of the locking member 430. As such, the resilient member 262 of the actuation module 260 in the embodiments as illustrated in FIGS. 3A and 3B can be omitted.

As shown in FIGS. 6A and 6B, the connecting device 400 further includes a connecting bar 480 connected between the linkage 440 and the locking member 430. The locking member 430 is rotatably and slidably connected to the connecting bar 480. The linkage 440 is pivotally connected to the connecting bar 480. Specifically, the connecting bar 480 has a sliding chute 481. The locking member 430 has a protrusion 431 rotatably and slidably engaged with the sliding chute 481. The linkage 440 has a pivotal portion 442 pivotally connected to the connecting bar 480. The sliding chute 481 has two ends 481a, 481b. A distance between the pivotal portion 442 and the ends 481a is smaller than a distance between the pivotal portion 442 and the end 481b. As shown in FIG. 6A, when the locking member 430 is rotated to the unlocked position, the protrusion 431 of the locking member 430 is at the end 481b of the sliding chute 481. As shown in FIG. 6B, when the locking member 430 is rotated to the locked position, the protrusion 431 of the locking member 430 is at the end 481a of the sliding chute 481. As such, when the locking member 430 is stuck and cannot rotate in accordance with the force applied by the resilient member 270 after the abutting portion 241 is disengaged from the engaging portion 233, the end 481b of the sliding chute 481 may force the locking member 430 to rotate to the unlocked position (referring to FIG. 6A) by pushing the protrusion 431. That is, the locking member 430 can be ensured to rotate to the unlocked position by the designs of connecting bar 480 connected between the linkage 440 and the locking member 430 when the resilient member 270 fails to rotate the locking member 430.

In addition, compared with the embodiments as illustrated in FIGS. 3A and 3B, the actuation module 460 omits the extending bar 261b and directly connects the linkage 440 with the driving shaft 261a. Furthermore, as shown in FIGS. 6A and 6B, the detector 250 works by detecting light blockage between the light emitting element and the light receiving element when the linkage 440 comes between the light emitting element and the light receiving element.

Figure 7:
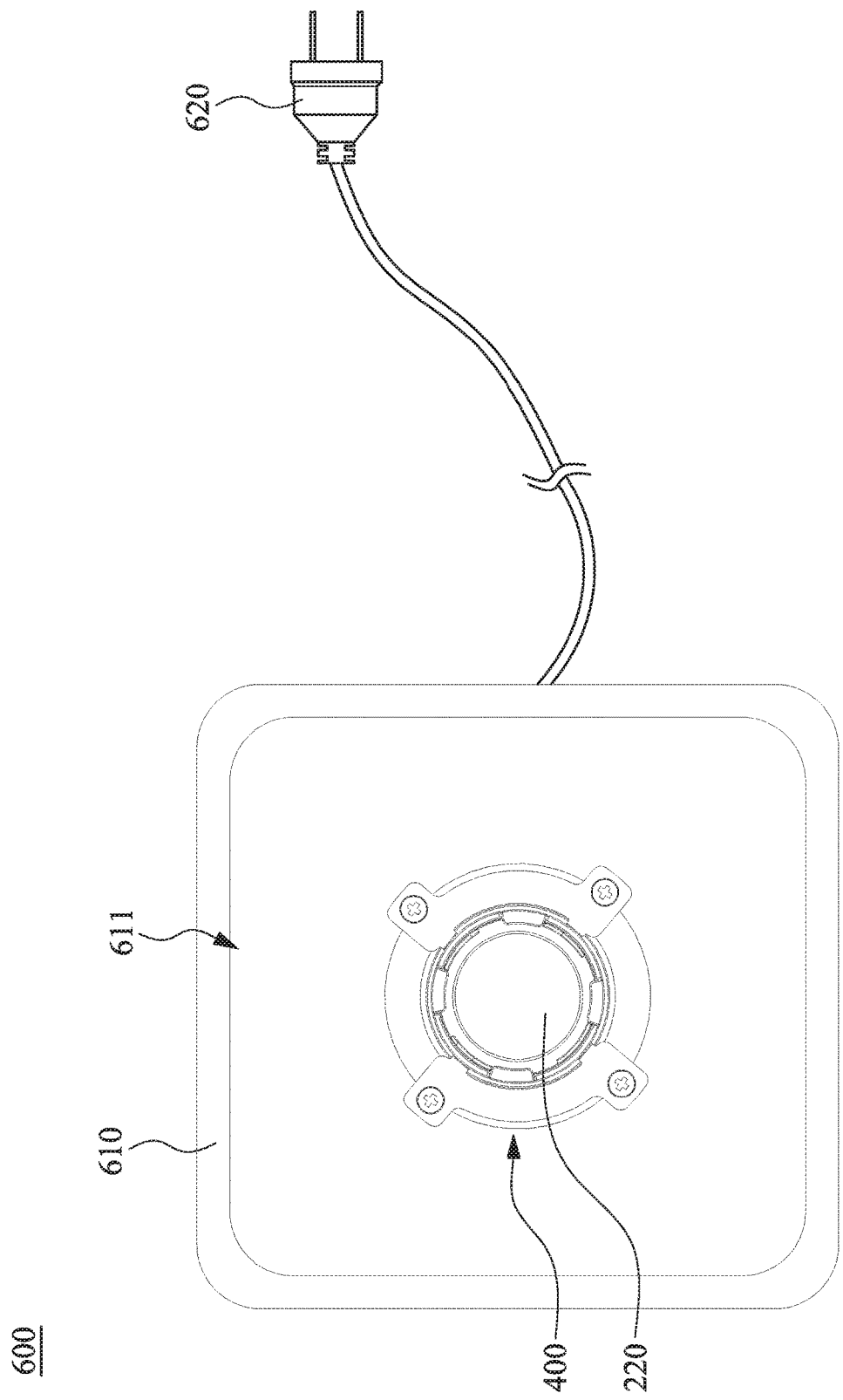
FIG. 7 is a top view of a charger according to some embodiments of the disclosure.

Reference is made to FIG. 7. FIG. 7 is a top view of a charger 600 according to some embodiments of the disclosure. The charger 600 includes a housing 610, a power plug 620, and the connecting device 400. The housing 610 has a recess 611 configured to accommodating at least a part of a battery pack, and the connecting device 400 is disposed at the bottom of the recess 611. An end of the power plug 620 is connected to the housing 610, and the connector 220 of the connecting device 400 is electrically connected to of the power plug 620. The power plug 620 is configured to plug into a power outlet so as to transmit power to charge the battery pack through the connector 220. In some other embodiments, the connecting device 400 can be replaced by the connecting device 200 as illustrated in FIGS. 3A and 3B or the connecting device 300 as illustrated in FIGS. 4A and 4B.

According to the foregoing recitations of the embodiments of the disclosure, it can be seen that in the connecting device of the disclosure, the locking member is configured to lock an installed/inserted battery pack while rotating to the locked position. The linkage of the connecting device is configured to keep the locking member in the locked position, thereby ensuring that the battery pack stay engaged with the connecting device. In addition, the linkage is designed to rotate to lock the locking member when the locking member is rotated to the locked position, and the detector of the connecting device is configured to detect the rotation of the linkage. As such, by determining whether the locking member is rotated to the locked position (through detecting the rotation of the linkage), whether the battery pack is properly installed/inserted to connect the connecting device can be determined.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

We claim:

1. A connecting device, comprising:
   a base;
   a locking member rotatably disposed on the base and configured to rotate about an axis to a locked position along a first rotational direction and to an unlocked position along a second rotational direction opposite to the first rotational direction, wherein an engaging portion is provided at a peripheral edge of the locking member;
   a linkage rotatably disposed on the base and comprising an abutting portion configured to abut against the peripheral edge, wherein when the locking member is rotated to the locked position, the abutting portion is moved to and is engaged with the engaging portion accompanied with a rotation of the linkage; and
   a detector disposed on the base and configured to detect the engagement between the abutting portion and the engaging portion.

2. The connecting device of claim 1, further comprising:
   an actuation module disposed on the base and comprising a moving member, wherein the actuation module is configured to rotate the linkage through the moving member so the abutting portion is disengaged from the engaging portion.

3. The connecting device of claim 2, wherein the actuation module further comprises a resilient member configured to apply a force to the linkage through the moving member, such that the abutting portion is continuously abutted against the peripheral edge.

4. The connecting device of claim 2, wherein the moving member has a pushing portion configured to push the locking member to rotate along the second rotational direction after the abutting portion is disengaged from the engaging portion.

5. The connecting device of claim 1, further comprising a resilient member disposed on the base and configured to apply a force to rotate the locking member along the second rotational direction.

6. The connecting device of claim 5, wherein the resilient member is connected between the base and the locking member.

7. The connecting device of claim 5, wherein the resilient member is connected between the linkage and the locking member.

8. The connecting device of claim 1, further comprising a connecting bar connected between the linkage and the locking member.

9. The connecting device of claim 8, wherein one of the linkage and the locking member is rotatably and slidably connected to the connecting bar, and another of the linkage and the locking member is pivotally connected to the connecting bar.

10. The connecting device of claim 9, wherein the connecting bar has a sliding chute, and said one of the linkage and the locking member has a protrusion rotatably and slidably engaged with the sliding chute.

11. The connecting device of claim 10, wherein said another of the linkage and the locking member has a pivotal portion pivotally connected to the connecting bar, the sliding chute has two ends, and distances from the pivotal portion respectively to said two ends are different.

12. The connecting device of claim 10, wherein the sliding chute has two ends, and the protrusion is abutted against one of said two ends when the locking member is rotated to the locked position and the unlocked position, respectively.

13. The connecting device of claim 1, further comprising a stage configured to move toward and away from the base, the stage having a first inclined portion and a second inclined portion, wherein the first inclined portion pushes the locking member to rotate along the first rotational direction when the stage is moved toward the base, and the second inclined portion pushes the locking member to rotate along the second rotational direction when the stage is moved away from the base.

14. The connecting device of claim 13, wherein the stage has a sliding chute, the first inclined portion and the second inclined portion are opposite inner edges of the sliding chute, and the locking member has a protrusion slidably engaged with the sliding chute.

15. The connecting device of claim 13, wherein the axis passes through the base, and the stage is configured to move toward and away from the base along the axis.

16. The connecting device of claim 13, further comprising a retaining member disposed on the base and configured to guide the stage to move toward and away from the base.

17. The connecting device of claim 1, wherein the locking member comprises a plurality of hooks surrounding the axis, and each of the hooks substantially extends along the first rotational direction.

18. The connecting device of claim 17, wherein the locking member is ring-shaped.

19. A vehicle, comprising:
    a housing; and
    the connecting device of claim 1, wherein the base is a part of the housing.

20. A charger, comprising:
    a housing; and
    the connecting device of claim 1, wherein the base is a part of the housing.

* * * * *